Patented Jan. 22, 1935

1,988,928

UNITED STATES PATENT OFFICE 1,988,928

MAKING RUBBER BACKED FIBROUS ARTICLES

Geoffrey William Trobridge, Sutton Coldfield, England, assignor to Dunlop Rubber Company Limited, Birmingham, England, a British Company No Drawing. Application January 27, 1934, Serial No. 708,712. In Great Britain February 16, 1933

7 Claims. (Cl. 91—68)

This invention relates to improvements in the production of articles of fibrous material provided with a relatively thick backing of rubber, and more particularly to the production of relatively thick articles of fibrous material such as carpets, rugs and mats provided with a relatively thick backing of rubber.

The object of the invention is to provide articles of fibrous material of the above type with a substantial or thick backing of rubber.

According to the present invention, the process for the production of improved articles of the above type comprises introducing suitable aqueous dispersions of rubber to a predetermined depth over a confined or restricted area, bringing a surface of the articles of fibrous material into direct contact with the aqueous dispersions aforesaid while at least the boundary surface of the aqueous dispersion of rubber is still in the uncoagulated or only semi-coagulated condition and subsequently drying the composite article produced.

If desired, the confined or restricted area such as a tray may be provided with a pressed, embossed or engraved pattern, and furthermore may be treated with a coagulant prior to the introduction of the aqueous dispersions aforesaid.

It may be found desirable to treat the upper surface of the fibrous material further removed from the aqueous dispersions of rubber with a coagulant prior, during or, preferably, subsequent to the contacting of the other surface of the fibrous material with the aqueous dispersions aforesaid.

Coagulation, if desired may also be effected merely by the evaporation of the water from the aqueous dispersions aforesaid subsequent to the contacting of the fibrous material therewith.

On the other hand, aqueous dispersions of rubber may be employed which have been made capable of gelling on the application of heat or in the cold in definite and controllable time intervals.

We are aware that it has already been proposed to bond the pile of a carpet or rug to its base or backing by means of adhesives such as rubber solution and rubber deposited in situ from a water dispersion of rubber, preferably concentrated rubber latex. The present invention, however, is particularly concerned with the application of such a thickness of rubber to the under surface of a carpet or mat so that the rubber layer applied will serve to make the carpet or mat draught proof or air proof. In this connection, it is preferably desirable to have a layer of rubber at least $\frac{1}{16}$th inch thick.

The emulsions or dispersions of rubber comprise those consisting of or containing rubber, gutta-percha, balata, or similar vegetable resins occurring naturally or artificially obtained.

Such artificial aqueous dispersions may include those of coagulated rubber, vulcanized rubber, synthetic rubber, waste or reclaim. If desired, any of the aforementioned dispersions may be used alone or in admixture with one another.

Any of the aforesaid dispersions may contain the usual known compounding ingredients and/or may be in concentrated form.

Concentrates such as are obtained in United States Patent 1,846,164, or in British Patent 219,635, to which may be added any one or more of the usual compounding ingredients, may also be used.

Examples of substances for making the aforesaid dispersions capable of gelling in the cold in definite and controllable time intervals are the salts of hydrofluosilicic acid such as sodium or potassium silicofluoride.

Examples of substances for making the aforesaid dispersions capable of gelling on the application of heat are the salts of hydrofluosilicic acid, such as sodium or potassium silicofluoride, ammonium persulphate or reagents which by chemical interaction with one another upon the application of heat produce one or more substances in situ which function as active coagulating agents, for example, a mixture of zinc oxide and ammonium sulphate.

The following is an example of a process for providing a carpet with a rubber backing according to the present invention—

A latex mixing of the following composition:

| | Parts by weight |
|---|---|
| Rubber (as latex) | 100 |
| Sulphur | 2 |
| Tetramethyl thiuramdisulphide | 1 |
| Mineral oil | 5 |
| Lamp black | 2 | is prepared from a 60% rubber latex obtained by centrifugal action. The solid content is approximately 55%.

200 grams of this mixing is then poured into a flat shallow tray of base area 10 sq. ft., and provided with an engraved pattern and which has been treated, for example, by spraying, with a liquid coagulant for example 80% acetic acid. The rubber latex is distributed as uniformly as possible with a hand scraper. Adjacent the tray is produced a coagulated film of rubber latex above which is a still fluid layer of latex mixing. The carpet to be treated, which must be smaller than the tray, is then laid back downwards in the tray upon this fluid layer, whereupon the latex mixing flows between and around the fibres forming the base of the pile and the foundation of the carpet. The upper side of the carpet is then treated, for example, by spraying with a suitable coagulant, for example, an alcoholic solution containing 20% of acetic acid. It is desirable that this coagulant should be volatile to obviate any need of subsequent washing.

After a standing period (normally about five minutes) sufficient for complete coagulation of the latex mixing, the carpet bearing the coagulated mixing adhering to its under side is removed from the tray, dried, vulcanized and trimmed in the usual manner.

Alternatively, the drying and vulcanizing operations may be carried out before stripping by transferring the tray and contents to a steam chest for a sufficient length of time. By this procedure, any tendency of the carpet to curl during drying is minimized.

Having described the said invention, what I claim is:—

1. A process for the production of articles of fibrous material with a backing of rubber to form a pile carpet structure which comprises spreading an aqueous dispersion of rubber material to a thin layer of shallow depth as compared with the thickness of the carpet structure to be formed, then placing a fibrous sheet having a backing back downwards onto said layer while the surface of said dispersion is still uncoagulated whereby said dispersion penetrates said backing structure, the layer having a depth of uncoagulated dispersion sufficient to penetrate only the backing part of said fibrous structure, and thereafter coagulating the rubber material of said layer.

2. A process as claimed in claim #1, wherein a pressed, embossed or engraved pattern is in contact with the spread dispersion on a surface other than that in contact with said fibrous material.

3. A process as claimed in claim #1, wherein the area on which the dispersion is spread is treated with a coagulant prior to the introduction of the aqueous dispersions aforesaid.

4. A process as claimed in claim #1, wherein the upper surface of the fibrous material further removed from the aqueous dispersions of rubber is provided with a coagulant when the lower surface of the fibrous material is in contact with the aqueous dispersions aforesaid.

5. A process as claimed in claim #1, wherein coagulation of the aqueous dispersions aforesaid is effected by evaporation of the water from the aqueous dispersions subsequent to the contacting of the fibrous material therewith.

6. A process as claimed in claim #1, wherein aqueous dispersions of rubber are employed which have been made capable of gelling on the application of heat or in the cold in definite and controllable time intervals.

7. A process for the production of articles of fibrous material with a backing of rubber which comprises spreading an aqueous compounded dispersion of rubber of a solid content of approximately 55% over an area at the rate of 200 grams of the dispersion to 10 square feet of area, treating said area prior to said spreading with a liquid coagulant uniformly distributed over said area and then placing a fibrous layer back downwards onto the surface of said layer of dispersion while the surface of said dispersion is still uncoagulated and treating the upper surface of said fibrous material with a volatile coagulant to prevent complete penetration of said article.

GEOFFREY WILLIAM TROBRIDGE.